United States Patent
Arena

[19]

[11] Patent Number: 5,899,295
[45] Date of Patent: May 4, 1999

[54] TREE STAND EXTENSION DEVICE

[76] Inventor: Philip A. Arena, 24 Linda Vista Dr., North Haledon, N.J. 07508

[21] Appl. No.: 08/758,143

[22] Filed: Nov. 25, 1996

[51] Int. Cl.$^6$ .................................................... E04G 3/00
[52] U.S. Cl. ........................................ 182/188; 108/152
[58] Field of Search .................................. 182/133, 134, 182/135, 136, 187, 188; 108/152

[56] References Cited

U.S. PATENT DOCUMENTS

| | | |
|---|---|---|
| D. 335,189 | 4/1993 | Saeva et al. . |
| D. 354,143 | 1/1995 | Floyd, Jr. . |
| 5,101,933 | 4/1992 | Huntley . |
| 5,103,935 | 4/1992 | Amacker . |
| 5,363,941 | 11/1994 | Richard . |
| 5,409,083 | 4/1995 | Thompson et al. . |

*Primary Examiner*—Daniel P. Stodola
*Assistant Examiner*—Richard M. Smith
*Attorney, Agent, or Firm*—Kenneth P. Glynn, Esq.

[57] ABSTRACT

A tree stand extension device has a rectangular, hollow base frame. The base frame has a center beam connected centrally, along a long axis, to the base frame. A plurality of engagement arms are attached to the base frame and the center beam to hold a tree stand. The plurality of engagement arms are parallel to each other along a short axis of the base frame and are a predetermined distance apart. The device further includes a pair of top attachment arms and a pair of corresponding bottom attachment arms. The pair of top attachment arms are coupled to the pair of corresponding bottom attachment arms, wherein a tree stand positioned on the remaining end of the plurality of engagement arms is encased therein by the pair of front attachment arms and the pair of corresponding rear attachment arms. In one embodiment, the coupling is accomplished by having a plurality of apertures in each of the pair of front attachment arms and the corresponding rear attachment arms. Bolts and nuts are then used to couple the device. The base frame and center beam have a non-skid material applied to aid footing.

13 Claims, 4 Drawing Sheets

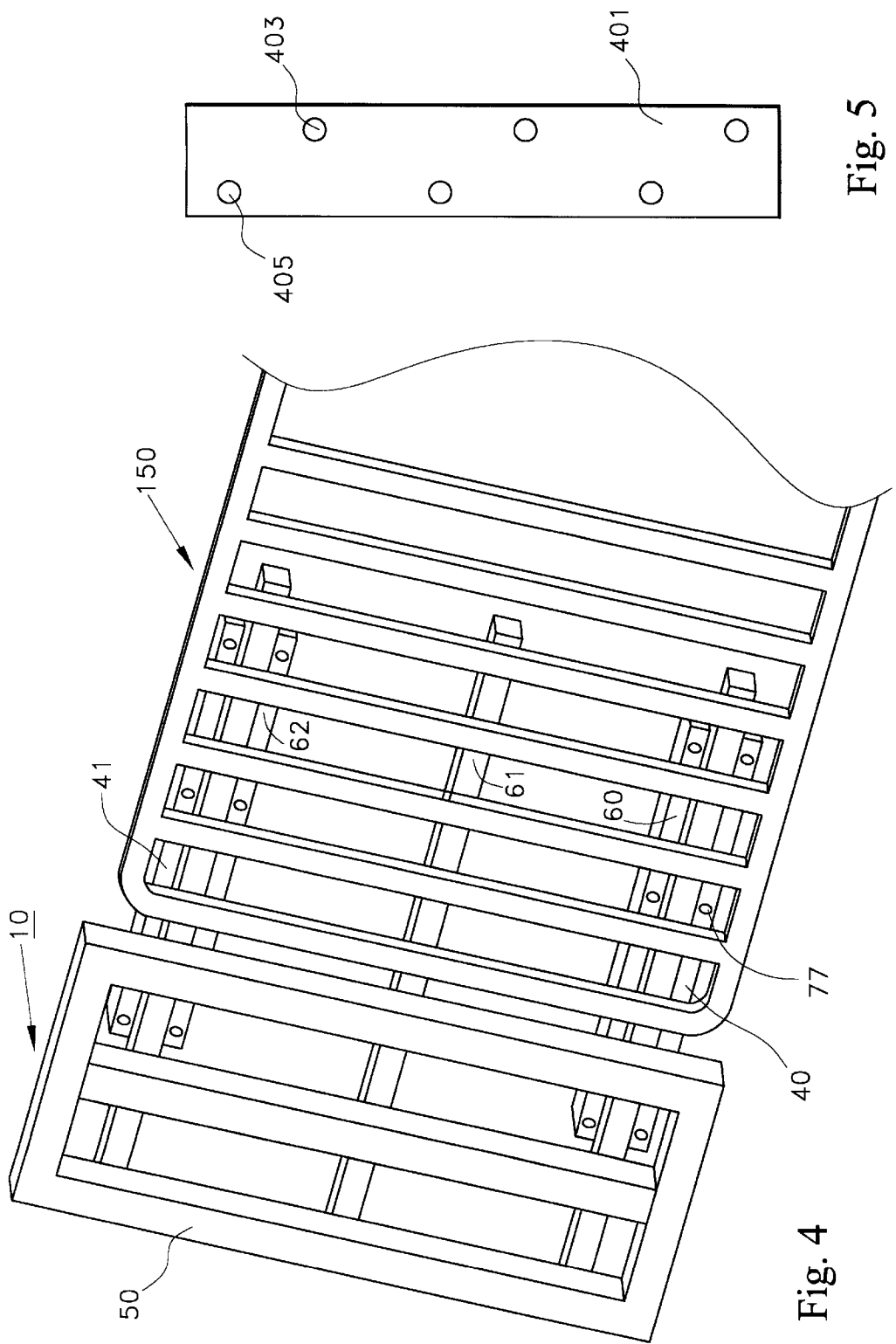

TREE STAND EXTENSION DEVICE

BACKGROUND OF THE INVENTION

1. Field of the Invention

The present invention is directed to tree stand devices and more particularly to tree stand extension devices which enlarge the area to be used by the user and is easily installed on any conventional tree stand without disfiguring the conventional tree stand device.

2. Information Disclosure Statement

The following patents represent different variations of tree stands which exemplify the art.

U.S. Design Pat. No. 335,189 to Paul A. Serva shows an ornamental design for a folding tree stand.

U.S. Design Pat. No. 354,143 to Claude A. Floyd, Jr., shows an ornamental design for a hunter's tree stand.

U.S. Pat. No. 5,101,933 to George E. Huntley describes an improved tree stand which has an unique seat design enabling the hunter to move the seat a confined distance while seated thereon and to swing the seat out of the way to the side of the stand if desired. The seat is attached to the main platform with means for horizontal sliding motion of the seat and for positioning the seat in a vertical alignment on the outside of the platform.

U.S. Pat. No. 5,103,935 to Joseph A. Amacker describes a tree stand with a telescoping seat. The device allows an user to engage a vertical member (i.e. a tree) such that the user can be supported above the ground. The device includes a frame for supporting the weight of the user, means for gripping the vertical member and a platform for receiving the feet of the user. A seat assembly carried by the support frame, includes a collapsible frame and the seat carried by the collapsible frame. The collapsible frame includes means for adjusting the vertical relationship between the seat and the platform, so as to accommodate users of different heights.

U.S. Pat. No. 5,363,941 to Roger Richard is an improved tree stand which is adapted such that it may be used on support members which may not be truly vertical. This allows the device to provide a level platform and/or seat arrangement irrespective of the orientation of the tree or support member. Leveling is accomplished by a telescopic arrangement attached to the standing platform thereby eliminating the need for ridged braces.

U.S. Pat. No. 5,409,083 to Kevin G. Thompson describes a tree stand utilized by hunters and outdoorsmen to provide an elevated view. The tree stand includes a support bracket adapted to be secured to a tree or pole, a strap for securing the support bracket to the tree or pole, and a platform including a generally flat planar member for supporting at least one person. It further includes a means for releasably interlocking the platform and the support bracket by pivoting the platform with respect to the support bracket to interlock the platform and the support bracket and prevent the platform from inadvertently separating from the support bracket. If desired, the platform may be removed from the support bracket and moved to other trees having extra support brackets as required.

Notwithstanding the prior art in this field, it is believed that the present invention, as described herein, is neither taught nor rendered obvious.

SUMMARY OF THE INVENTION

Hunters, wildlife photographers and others use tree stands and/or similar devices to sit or stand at higher elevations to get a better view or angle at the event of interest. The present invention is a tree stand extension device which allows the users to increase the platform area available with conventional tree stands and related devices easily and without damaging the tree stand itself. It would allow the users to extend their legs or place items on the device so that they can be more comfortable. The tree stand extension device can be used with any tree stand device. The device is attached to existing tree stand devices by simply aligning the base frame of the tree stand extension device with the tree stand and then bolting the two pieces together with the two attachment bars. The device does no damage to the tree stand and can be easily removed and subsequently attached to another tree stand.

The present invention accomplishes the above functionality and corrects the defects of past devices by providing a tree stand extension device which has a rectangular, hollow base frame. The base frame having a center beam connected centrally, along a long axis, to the base frame. A plurality of engagement arms are attached to the base frame and the center beam to hold a tree stand. The plurality of engagement arms are parallel to each other along a short axis of the base frame and are a predetermined distance apart. The device further includes a pair of top attachment arms and a pair of corresponding bottom attachment arms. The pair of top attachment arms are coupled to the pair of corresponding bottom attachment arms, wherein the remaining end of the plurality of engagement arms are encased therein by the pair of front attachment arms and the pair of corresponding rear attachment arms. In one embodiment, the coupling is accomplished by having a plurality of apertures in each of the pair of top attachment arms and the corresponding bottom attachment arms. Bolts and nuts are then used to couple the device. A non-skid material is applied to the base frame and center beam to aid footing.

BRIEF DESCRIPTION OF THE DRAWINGS

The present invention will be more fully understood when the specification herein is taken in conjunction with the drawings appended hereto, wherein:

FIG. 4 shows a front perspective view of an embodiment of the device with a partial view of another type of tree stand platform.

FIG. 5 shows an alternative arm attachment component for a present invention device.

DETAILED DESCRIPTION OF THE PRESENT INVENTION

The present invention is a tree stand extension device. The purpose of the device is to allow hunters, wildlife photographers and others who use tree stands and/or similar devices to sit or stand at higher elevations, to increase the platform space in an easy and safe fashion. The extra platform area allows the user to take and place various items on the platform and/or allows the user to rest or stretch out on the extra platform area.

Figure 1:
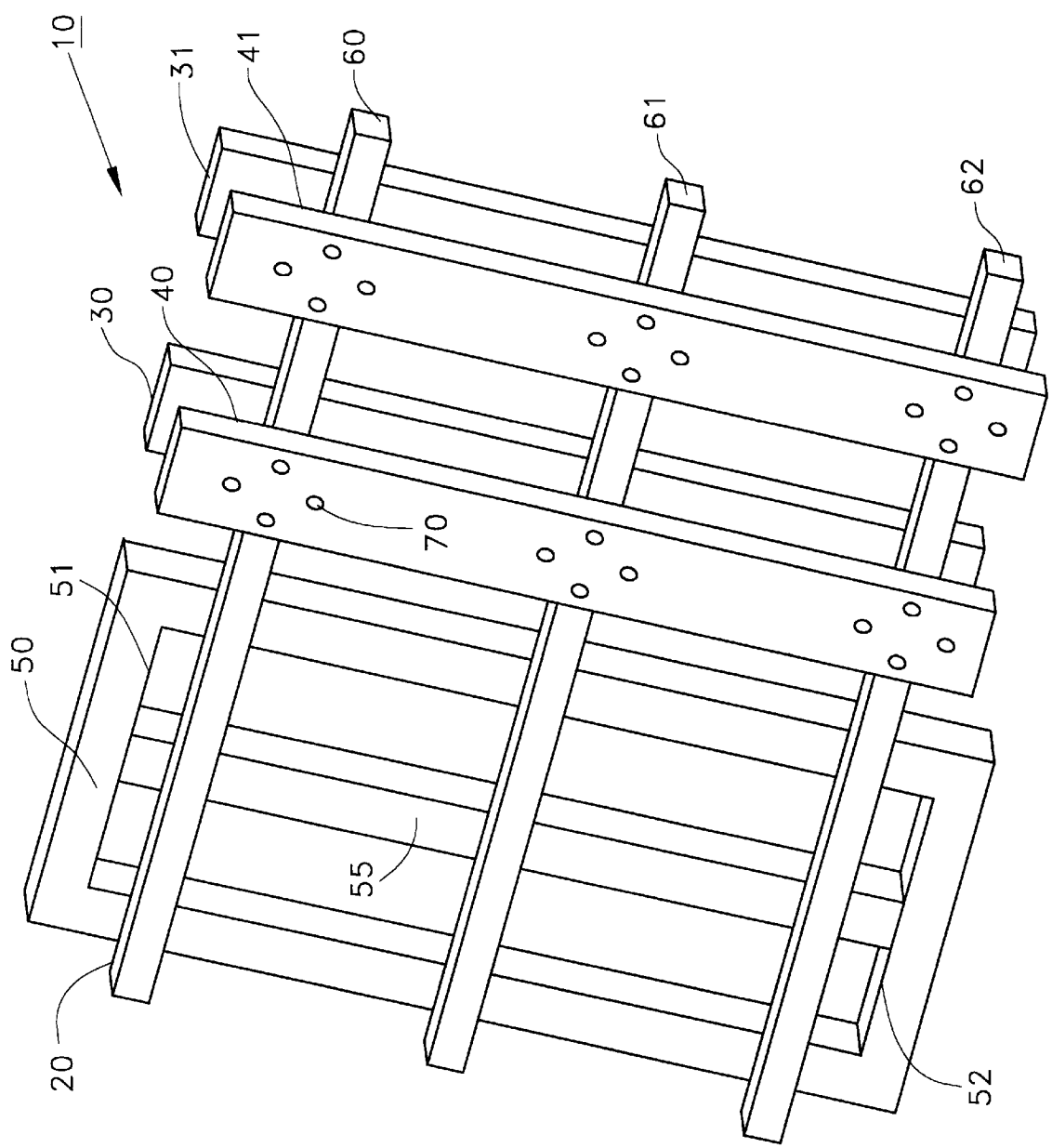
FIG. 1 shows a rear perspective view of an embodiment of the present invention.
Figure 2:
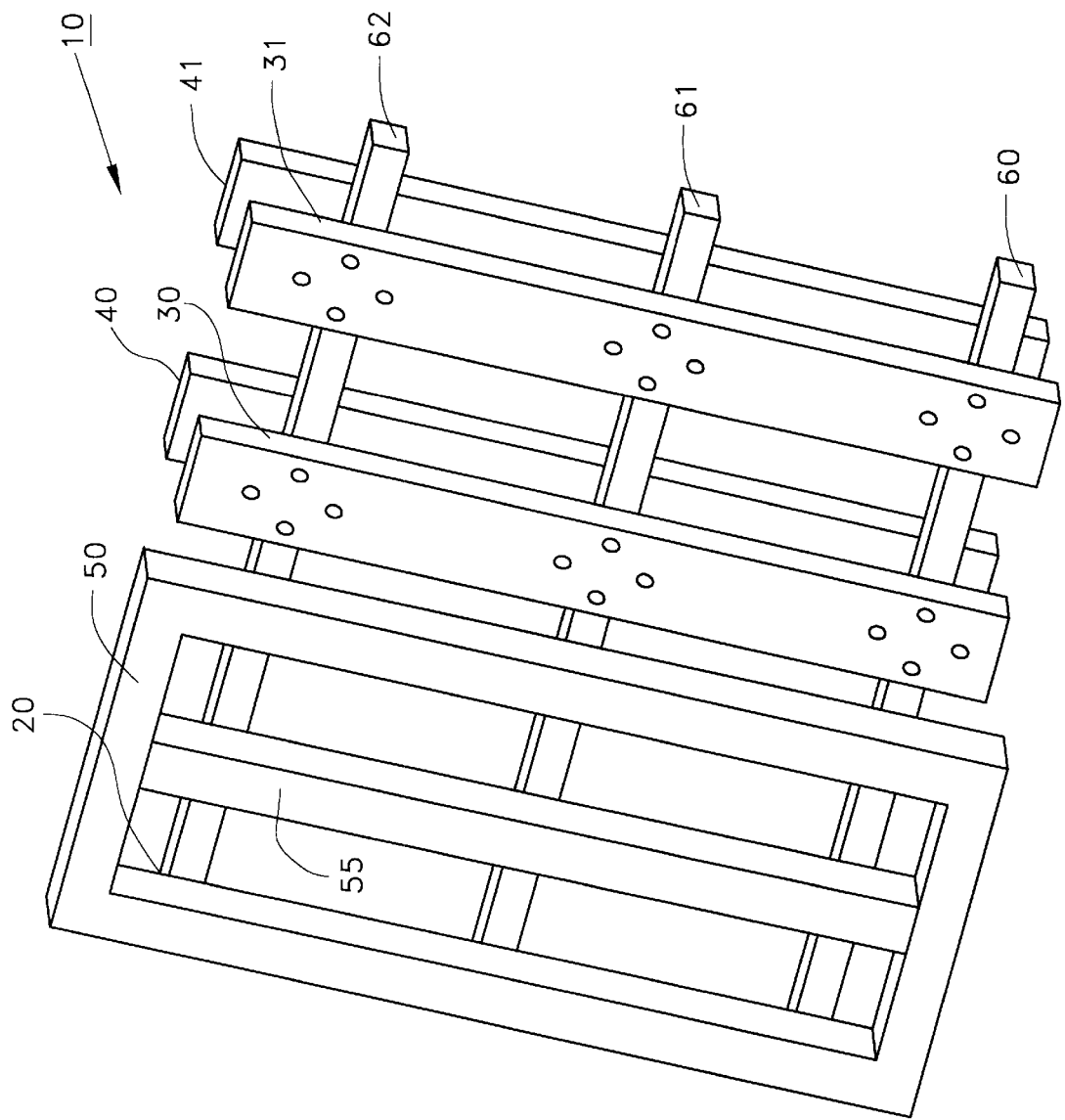
FIG. 2 shows a front perspective view of the embodiment shown in FIG. 1.

Referring to FIGS. 1 and 2, the present invention is a tree stand extension device and is generally depicted as 10. Tree stand extension device 10 has a platform 20, a pair of top attachment arms 30 and 31, and a pair of corresponding bottom attachment arms 40 and 41. Platform 20 has a base frame 50, a center beam 55, and a plurality of engagement arms, preferably three parallel engagement arms 60, 61 and 62. Top attachment arms 30 and 31 and bottom attachment arms 40 and 41 each have a plurality of apertures 70 so that a plurality of bolts and nuts 80 (not shown) can be used to attach tree extension device 10 to a tree stand or some other similar device.

Base frame 50 and center beam 55 are preferably constructed from aluminum stock. For example, the aluminum stock could be 1" square hollow stock having ⅛" sidewalls. The long axis of base frame 50 and center beam 55 are preferably 18" and the short axis of base frame 50 is preferably 8". Parallel engagement arms 60, 61 and 62 are preferably constructed out of aluminum stock having a size of ¾"×½", each engagement arm having a length of preferably 18". Top and bottom attachment arms 30, 31, 40 and 41 are preferably constructed from 2"×½" flat aluminum stock or aluminum plate and are preferably 15" long. Bolts and nuts 80 are preferably ¼" flat head bolts with accompanying nuts, both of which are made from steel. The materials and sizes listed are preferred, but it would be apparent in view of the present disclosure to substitute alternative but equally feasible materials. In addition, the size of the platform can be adjusted, in view of the disclosure, to accommodate any and all tree stands or similar devices.

Base frame 50 has a generally rectangular, hollow shape with center beam 55 situated along the long axis. Center beam 55 is positioned centrally in base frame 50 and is either attached to base frame 50 via welding or some other similar means or alternatively, base frame 50 and center beam 55 are uni-structurally constructed. A non-skid material can be applied to one side of base frame 50 and center beam 55 to aid in footing on same. Engagement arms 60, 61 and 62 are then positioned on base frame 50 along the short axis and in a parallel fashion. Extension arms 60, 61 and 62 are attached either by welding, using bolts or via other attachment mechanisms. Using the dimensions listed above, engagement arm 60 and 62 are preferably positioned 2" from an edge 51 and 52, respectively. Engagement arm 61 is centrally located between engagement arm 60 and 62. Note that the positioning of engagement arms 60, 61, and 62 on base frame 50 and center beam 55 are done to ensure that the resulting gridwork provides a footing for the user which does not have large openings. That is, the spacing of engagement arms 60, 61 and 62 ensure that the gaps between engagement arms 60, 61 and 62, base frame 50 and center beam 55 are not of a size to cause footing or utility problems. A feature of this construction is that the attachment mechanism gridwork is also the footing for tree stand extension device 10.

Figure 3:
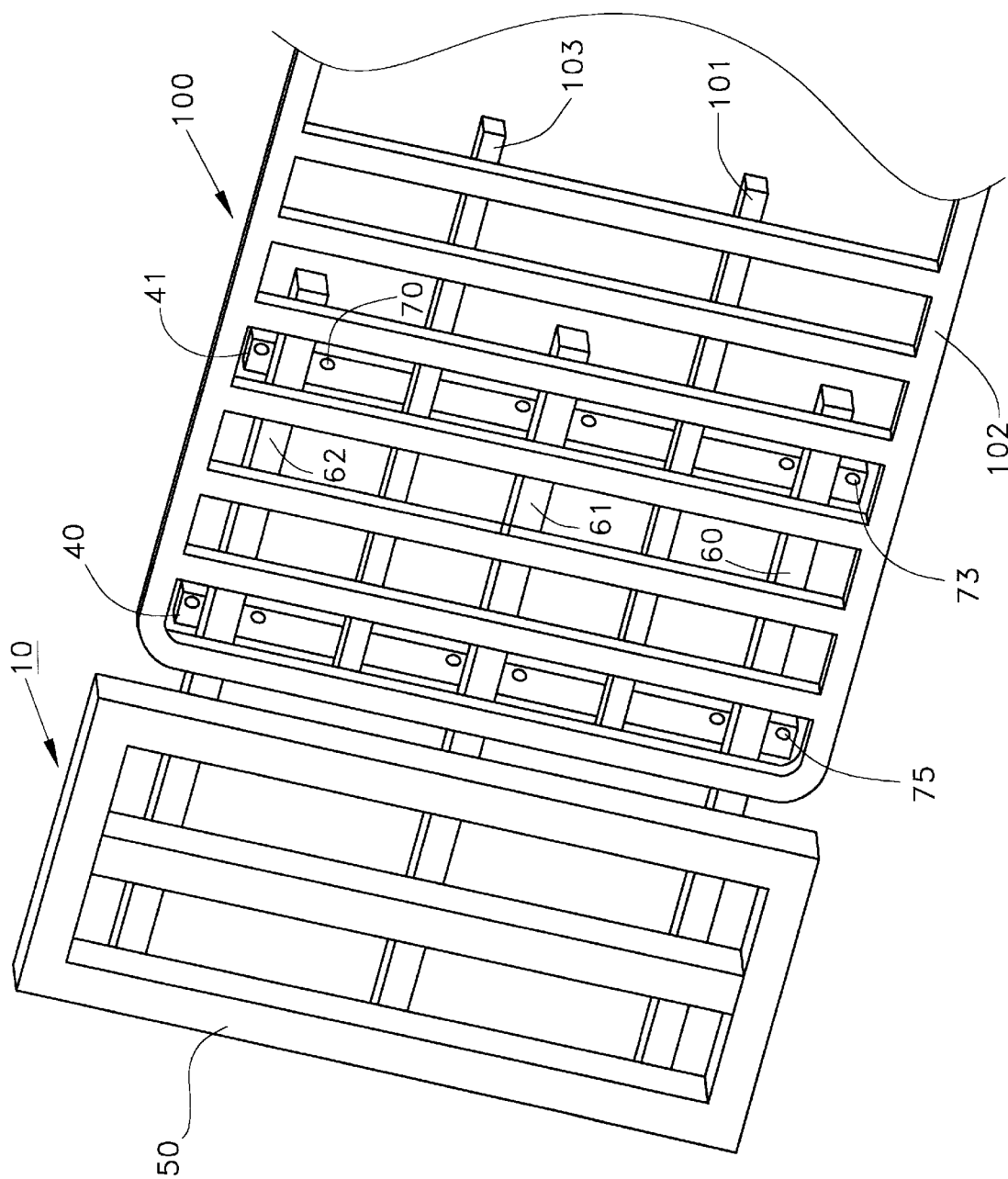
FIG. 3 shows a front perspective view of an embodiment of the device with a partial view of a tree stand platform.

Referring to FIG. 3, where identically numbered items shown also in FIGS. 1 and 2 represent identical parts, a tree stand extension device 10 is shown in relation to a partial view of a tree stand device 100. Tree stand device 100 includes a main frame 102 and under supports 101 and 103 which are welded to main frame 102, as shown. Functionally, bottom attachment arms 40 and 41 are placed on one side of extension device 10's engagement arms 60, 61 and 62. Attachment arms 40 and 41 are positioned such that they are parallel to the platform rail pattern of tree stand device 100. In this instance the platform pattern is perpendicular to engagement arms 60, 61 and 62. Therefore, bottom attachment arms 40 and 41 will also be perpendicular to engagement arms 60, 61 and 62 and will, as described, be physically attached to the undersupport 101 and 103. Tree stand device 100 is then placed on the other side of engagement arms 60, 61 and 62 adjacent to base frame 50. Top attachment arms 30 and 31 (as shown in FIG. 1 and not shown here) are then placed on top of tree stand device 100 and in alignment with bottom attachment arms 40 and 41. Note that bottom attachment arms 40 and 41 are physically sized to conveniently fit between the rails of main frame 102 and note further that when top attachment arms 30 and 31 are placed atop as just mentioned, they will physically fit between the rails of main frame 102 to maintain the surface elevational integrity of tree stand device 100. Bolts and nuts (not shown) are then placed in apertures such as apertures 70, 73 and 75 to connect bottom attachment arms 40 and 41 and top attachment arms 30 and 31. Tree stand device 100 is thereby firmly attached to tree stand extension device 10. Although the scale of elements shown in FIGS. 1 and 2 may be different from FIG. 3, this is merely to illustrate the relative positioning with respect to tree stand device 100.

Referring to FIG. 4, where identically numbered items relative to previous Figures represent identical parts, a tree stand extension device 10 is shown in relation to a tree stand device 150. Functionally, rear attachment arms 40 and 41 are placed on one side of engagement arms 60, 61 and 62. Attachment arms 40 and 41 are positioned such that they are perpendicular to the platform rail pattern of tree stand device 150. In this instance the platform pattern is perpendicular to engagement arms 60, 61 and 62. Therefore, bottom attachment arms 40 and 41 are parallel to engagement arms 60, 61 and 62. Tree stand device 150 is then placed on the other side of engagement arms 60, 61 and 62 adjacent to base frame 50. Top attachment arms 30 and 31 (as shown in FIG. 1 and FIG. 2, but not here) are then placed on top of tree stand device 150 and in alignment with bottom attachment arms 40 and 41. Bolts and nuts (not shown here) are then placed in apertures such as aperture 77 to connect bottom attachment arms 40 and 41 and top attachment arms 30 and 31. Tree stand device 150 is thereby firmly attached to tree stand extension device 10.

In some preferred embodiments, the number of the bolt holes patterned at 45° to the sides of the attachment arms so that parallel or perpendicular attachment may be achieved using the same staggered bolt holes. Thus, FIG. 5 illustrates engagement arm 401 and shows such staggered bolt holes as, e.g., holes 403 and 405.

Referring now to FIGS. 3 and 4, note that in attaching tree stand extension device 10 to tree stand device 100 or 150 does not result in having to alter or damage the tree stand device itself. It requires no drilling or any other type of modification to the tree stand device itself. As such, tree stand extension device 10 is easily attached and detached from any type of tree stand device.

Obviously, numerous modifications and variations of the present invention are possible in light of the above teachings. It is therefore understood that within the scope of the appended claims, the invention may be practiced otherwise than as specifically described herein.

What is claimed is:

1. A platform extension device, comprising:

a) a platform;

b) a plurality of engagement arms;

c) an end of each of said plurality of engagement arms being attached to said platform, said plurality of engagement arms being parallel to each other along a short axis of said platform and being a predetermined distance apart;

d) a pair of top attachment arms and a pair of corresponding bottom attachment arms, said pair of top attachment arms being attached atop said engagement arms at a location remote from said base frame, and said pair of bottom attachment arms being attached under said engagement arms at a location remote from said base frame, said pair of top attachment arms and said pair of bottom attachment arms being coupled to one another with said engagement arms therebetween, said top and said bottom attachment arms being positioned in alignment with one another; and, e) means for detachably coupling said pair of top attachment arms to said pair of corresponding bottom attachment arms, wherein a remaining end of said plurality of engagement arms is encased therein by said pair of top attachment arms and said pair of corresponding bottom attachment arms.

2. The platform extension device as recited in claim 1, wherein said platform includes a base frame and a center beam.

3. The platform extension device as recited in claim 1, wherein:

a) said pair of top attachment arms and said corresponding bottom attachment arms each having a plurality of apertures; and b) said means for coupling is a plurality of bolts and nuts which correspond to said plurality of apertures.

4. The platform extension device as recited in claim 1, wherein a non-skid material is applied to a surface of said platform.

5. A tree stand extension device, comprising:

a) a four-sided rectangular, hollow base frame;

b) said base frame having a center beam connected centrally, along a long axis, to said base frame;

c) a plurality of engagement arms, an end of each of said engagement arms being attached to said base frame and said center beam, said plurality of engagement arms being parallel to each other along a short axis of said base frame and being a predetermined distance apart, said plurality of engagement arms being extended outwardly from said base frame and being connected to a pair of top attachment arms and a pair of corresponding bottom attachment arms, said pair of top attachment arms being attached atop said engagement arms at a location remote from said base frame, and said pair of bottom attachment arms being attached under said engagement arms at a location remote from said base frame, said pair of top attachment arms and said pair of bottom attachment arms being coupled to one another with said engagement arms therebetween; and, d) means for coupling said pair of top attachment arms to said pair of corresponding bottom attachment arms, wherein a remaining end of said plurality of engagement arms is encased therein by said pair of top attachment arms and said pair of corresponding bottom attachment arms.

6. The tree stand extension device as recited in claim 5, wherein said base frame and said center beam are unistructurally formed.

7. The tree stand extension device as recited in claim 6, wherein:

a) said pair of top attachment arms and said corresponding bottom attachment arms each having a plurality of apertures; and b) said means for coupling is a plurality of bolts and nuts which correspond to said plurality of apertures.

8. The tree stand extension device as recited in claim 7, wherein a non-skid material is applied to a surface of said base frame and said center beam.

9. The tree stand extension device as recited in claim 5, wherein said plurality of engagement arms is three.

10. The tree stand extension device as recited in claim 9, wherein:

a) said pair of top attachment arms and said corresponding bottom attachment arms each having a plurality of apertures; and b) said means for coupling is a plurality of bolts and nuts which correspond to said plurality of apertures.

11. The tree stand extension device as recited in claim 10, wherein a non-skid material is applied to a surface of said base frame and said center beam.

12. The tree stand extension device as recited in claim 5, wherein:

a) said pair of top attachment arms and said corresponding bottom attachment arms each having a plurality of apertures; and b) said means for coupling is a plurality of bolts and nuts which correspond to said plurality of apertures.

13. The tree stand extension device as recited in claim 5, wherein a non-skid material is applied to a surface of said base frame and said center beam.

* * * * *